(12) United States Patent
Psaltis et al.

(10) Patent No.: US 7,483,190 B2
(45) Date of Patent: Jan. 27, 2009

(54) METHOD AND APPARATUS FOR IMPLEMENTING A MULTI-CHANNEL TUNABLE FILTER

(75) Inventors: Demetri Psaltis, Pasadena, CA (US); Christophe Moser, Pasadena, CA (US); Greg Steckman, Pasadena, CA (US); Karsten Buse, Gmhuette (DE); Ingo Nee, Papenburg (DE); Joerg Hukriede, Lengerich (DE)

(73) Assignee: Ondax, Inc., Monrovia, CA (US)

( * ) Notice: Subject to any disclaimer, the term of this patent is extended or adjusted under 35 U.S.C. 154(b) by 360 days.

(21) Appl. No.: 11/371,506

(22) Filed: Mar. 8, 2006

(65) Prior Publication Data
US 2006/0156241 A1    Jul. 13, 2006

Related U.S. Application Data

(60) Continuation-in-part of application No. 11/004,319, filed on Dec. 3, 2004, now Pat. No. 7,136,206, which is a division of application No. 10/006,934, filed on Dec. 4, 2001, now Pat. No. 6,829,067.

(60) Provisional application No. 60/251,350, filed on Dec. 4, 2000.

(51) Int. Cl.
*G02B 5/32*    (2006.01)

(52) U.S. Cl. ................................. 359/15; 385/37; 359/7
(58) Field of Classification Search .................... 359/7, 359/15; 385/37
See application file for complete search history.

(56) References Cited

U.S. PATENT DOCUMENTS

| | | | |
|---|---|---|---|
| 2002/0146226 A1* | 10/2002 | Davis et al. .................. | 385/126 |
| 2003/0179788 A1* | 9/2003 | Wildeman et al. ............ | 372/20 |
| 2004/0037503 A1* | 2/2004 | Hastings et al. ............... | 385/37 |

* cited by examiner

*Primary Examiner*—Fayez G Assaf

(57) ABSTRACT

The present invention provides a multi-channel tunable filter and methods for making such a filter. In one embodiment, the filter comprises a bank of gratings or a continuously varying filter frequency imprinted into a filter material, such as Lithium Niobate or glass or polymer. An optical read-head comprising a pair of lenses is configured to pass light from within an optical fiber carrying multiple wavelengths through an appropriate grating to extract or drop a specific wavelength. To ensure continuous data transmission, the filter is tuned to a wavelength by configuring the read-head to move in a hitless manner. In one embodiment, the gratings are recorded by the interference of two beams. A first plane wave reflects off a first mirror stack and a second plane wave reflects off a second mirror stack. In another embodiment, the gratings are recorded by a phase masking method.

16 Claims, 20 Drawing Sheets

Far field recording

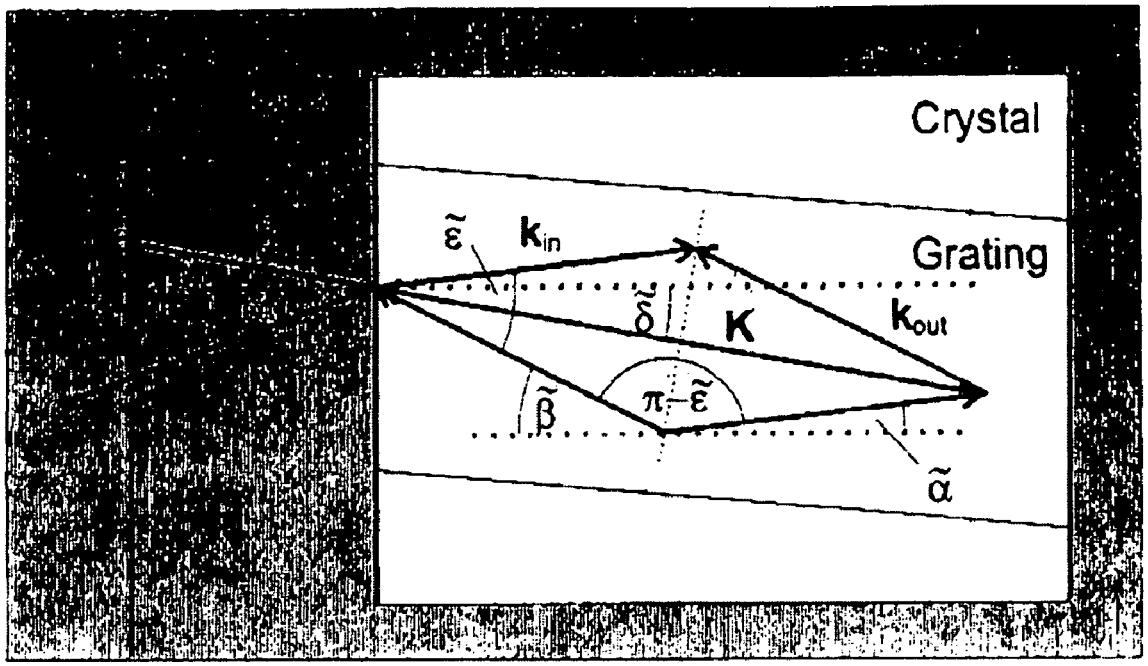

$\tilde{\alpha}$ = input beam in the crystal; $\alpha$ = input beam in air $\tilde{\beta}$ = output beam in the crystal; $\beta$ = output beam in air;

$\tilde{\varepsilon}$ = full angle between the read out beams in the crystal;

$\varepsilon$ = full angle between the read out beams in air;

$\tilde{\delta}$ = slant angle of the grating vector in the crystal at room temperature;

$\tilde{\delta}^H$ = slant angle of the grating vector in the crystal at 180 °C;

$\delta$ = slant angle of the dual fiber collimator;

$\mathbf{K}$ = grating vector; $\mathbf{k}_{in}$ and $\mathbf{k}_{out}$ = wave vectors (in and out);

$\Lambda_G$ = grating period of the refractive index pattern at room temperature;

$\Lambda_G^H$ = grating period of the refractive index pattern at 180 °C;

$\Lambda_P$ = grating period of the phase mask;

$\lambda_R$ = read out wavelength $n_R$ = refractive index for infrared light $a_z = 4.5 \cdot 10^{-6} K^{-1}$; $a_y = 1.5 \cdot 10^{-5} K^{-1}$; thermal expansion koefficients $T_R = 25°C$, read out temperature; $T^H{}_R = 180°C$, recording temperature; $\Delta T = 155K$;

FIGURE 11

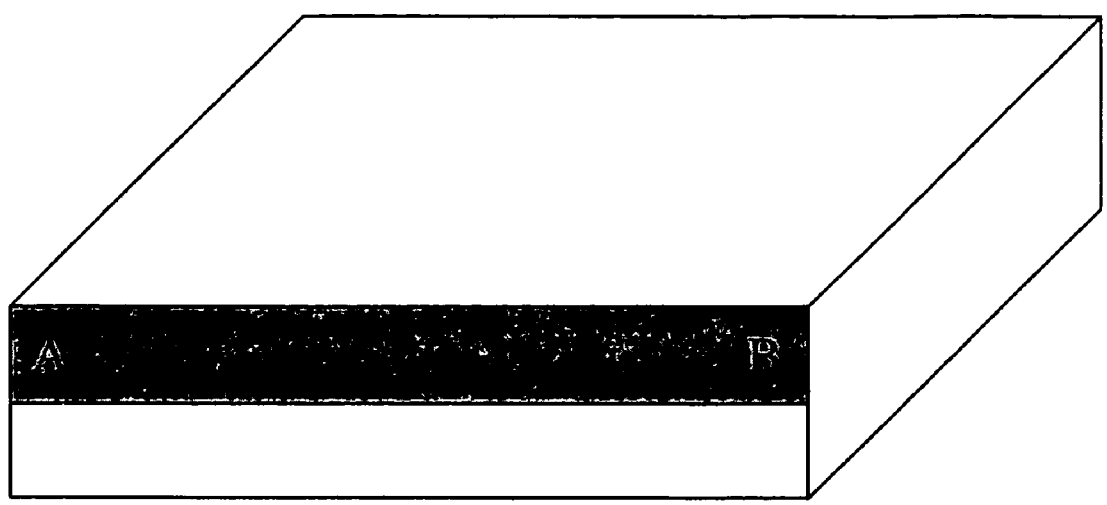
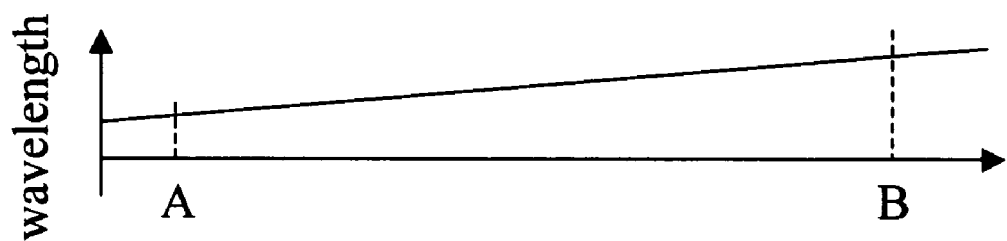
Figure 15

METHOD AND APPARATUS FOR IMPLEMENTING A MULTI-CHANNEL TUNABLE FILTER

RELATED APPLICATION

This patent application is a continuation-in-part of patent application Ser. No. 11/004,319 filed Dec. 3, 2004 now U.S. Pat. No. 7,136,206 entitled "Method and Apparatus for Implementing a Multi-Channel Tunable Filter", which is a divisional patent application of application Ser. No. 10/006, 934, now U.S. Pat. No. 6,829,067 filed Dec. 4, 2001 and entitled "Method and Apparatus for Implementing a Multi-Channel Tunable Filter", which claims priority to provisional patent application Ser. No. 60/251,350 filed Dec. 4, 2000.

BACKGROUND OF THE INVENTION

1. Field of the Invention

The present invention relates to fiber optics, lasers, and in particular the invention is directed to a multi-channel tunable filter.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Digital and analog information is often communicated using optical fibers. In some schemes, many signals, each with its own optical wavelength, are communicated on the same optical fiber. At some point, it is necessary to add or to extract a signal (i.e. a particular optical wavelength) from the optical fiber and this is accomplished with an optical add/drop filter. Various types of optical filters have been developed for use in telecommunications. Fixed wavelength optical filters are the most commonly used in today's networks to filter optical channels off a multiplexed stream of wavelengths. A problem with fixed wavelength filters is that they are limited to a single fixed optical wavelength. The increasing rate at which information is transferred makes the network increasingly difficult to manage. Network manageability can be simplified by selectively routing information at the wavelength level. This can be understood by a review of optical signal transmission schemes.

With the rapid emergence of the Internet, there is a great need to increase the volume of data that can be transmitted across a network of computing devices (commonly termed bandwidth). Initially, optical fiber networks carried only a single signal at a single wavelength. The bandwidth of optical fibers was increased by using a scheme known as wavelength division multiplexing (WDM).

The concept of WDM is to launch and retrieve multiple data channels in and out, respectively, of an optical fiber. Prior to the use of WDM, most optical fibers were used to unidirectionally carry only a single data channel at one wavelength. WDM divides a network's bandwidth into channels, with each channel assigned a particular channel wavelength. This allows multiple signals (each at a different wavelength) to be carried on the same transmission medium. For example, multiple optical channels can be used with fiber optic cable to transmit multiple signals on the same cable. The gain in the network bandwidth is given by the aggregation of multiple single channel bandwidth.

In most situations, the channels are merged (multiplexed) at a transmitting end and transmitted to a receiving end where they are separated (demultiplexed) into individual signals. In the existing systems, the transmitting and receiving ends must be tuned to the same wavelengths to be able to communicate. That is, the transmitting and receiving ends use a device such as an add/drop multiplexer to transmit/receive a fixed signal channel. In the case of fiber optic cable, an optical add/drop multiplexer can be used at nodes or at the receiving ends to generate a fixed wavelength (e.g., using lasers) and to receive a fixed wavelength. For example consider four channels 1, 2, 3 and 4. If the transmitting end is sending via channel 1, the receiving end must tune into the channel 1 wavelength as well to receive the data signal. When the transmitting end switches to channel 2, the receiving end must follow as well. Existing systems have as many as 2-128 signal channels.

In WDM, add/drop filters are needed to direct traffic in Long-Haul or Metropolitan networks. Current drop filter implementations lack flexibility. Some implementations have fixed wavelength drop filters. In these filters, each add/drop filter is fixed, meaning it is configured to extract and transmit only a specific wavelength within the optical fiber. This limits the flexibility for bandwidth allocation that WDM can provide.

In other filters where switching is allowed, the switching is often done in a non-hitless manner, meaning data is lost or interrupted during switching. Achieving hitless (non-blocking) wavelength switching is a challenge in drop filter design. In many critical applications the loss of data signal or interruption of service during wavelength switching is unacceptable. In these applications, the ability to hitlessly select a new wavelength without interruption of data flow is a requirement. However, many existing implementations of prior art tunable add/drop filters do not have this hitless property.

Typical examples of tunable optical filters include Fabry-Perot based tunable filters ("Fabry-Perot Tunable Filters Improve Optical Channel Analyzer Performance", Calvin Miller, Lawrence Pelz, Micron Optic Corp. and Siemens Corp.), ring resonator tunable filters ("Micro-ring Resonator Channel Dropping Filters", B. E Little, S. T Shu, H. A. Haus, J. Foresi, , J.-P Laine, Journal of Lightwave Technology, vol 15. No 6, 1997), Fiber Bragg grating (FBG) tunable filters ("Bragg grating Fast tunable filter for wavelength division multiplexing", A. Iocco, H. G Limberger, R. P Salathe, L. A. Everall, K. E. Chisholm, J. A R. Williams, I. Bennion), thin film tunable filters (www.santec.com ), Acousto-Optic tunable filter ("Ti:LiNbO$_3$ Acousto-optic tunable filter (AOTF)", T. Nakazawa, S. Taniguchi, M. Seino, Fujitsu, Sci. Tech. J, 35, 1, pp 107-112, 1999), Mach-Zehnder interferometers and electro-optic tunable filters. A review of these type of tunable optical filters is presented in "Tunable Optical Filters for Dense WDM Networks", D. Sadot, E. Boimovich, IEEE communication magazine, December 1998, page 50-55.

Fabry-Perot (FP) and ring resonator (RR) filters are based on the same principle: light bounces back and forth between two high reflectivity mirrors or circulate multiple times in the ring. Tunability is achieved by changing the optical path between the mirrors (or in the ring). By tuning from one wavelength to another, all wavelengths in-between are being swept during tuning yielding a blocking tuning. Fiber Bragg gratings use a periodic perturbation of the refractive index of a material to selectively reflect a particular wavelength: tunability is achieved by changing the period of the perturbation by applying mechanical or thermal stress. This tuning mechanism is blocking as well.

Tunable thin film filters are made by deposition of multiple layers of varying thickness and index of refraction. Tunability is achieved by spatially varying the layer thickness. Acousto-optic filters rely on the modulation of the index of refraction by the interaction of a acoustical wave launched in the material with a transducer. Tunability is achieved by varying the frequency of the acoustical wave. Although such a tuning mechanism is non-blocking (hitless), these filter are relatively broad-band (>1 nm) and difficult to fabricate.

SUMMARY OF THE INVENTION

The present invention provides a multi-channel tunable filter and methods for making (or recording) such a filter. In one embodiment, the tunable filter comprises a bank of gratings or a continuously varying grating imprinted into a holographic substrate material, such as, but not limited to Lithium Niobate, photorefractive glass or polymer. Each grating reflects light at a specific wavelength, allowing light waves of all wavelengths except one to pass. In another embodiment, the tunable filter comprises a bank of gratings or a continuously varying thin film filter. For thin films, each grating reflects all wavelengths except a specific one. This allows light waves of only one wavelength to pass. An optical readhead comprising a pair of lenses (e.g. one dual fiber collimator and a single fiber collimator or two dual fiber collimators or two single lens collimators on each side) is configured to collimate the light that is then sent through an appropriate grating. The light reflected (a single wavelength for the volume holographic gratings and all wavelengths minus one for the thin film) is captured by the collimator positioned appropriately on the same side as the input collimator; the remainder of the channels (all minus one for the volume holographic gratings and a single wavelength for the thin film) are captured by a collimator positioned on the opposite side of the filter. The collimator receiving the filtered wavelength is called the drop collimator. Conversely, the drop collimator can also be configured to add a wavelength instead of dropping a wavelength. Thus the tunable filter of the invention can add or drop one of the wavelengths from an optical fiber carrying multiple wavelengths.

In one embodiment of the present invention, the optical head is configured to move in a manner that avoids passing light waves through other gratings when a new grating is selected. This enables the tunable filter to achieve non-blocking (or hitless) architecture. If a different wavelength is desired to be added or extracted from the same fiber, the optical head moves to the appropriate grating in this hitless manner. In an alternate embodiment, the tunable add/drop filter of the present invention can be implemented in a blocking implementation.

In an alternate embodiment, the fabricated filter with a bank of gratings or a continuously varying grating can be implement to alter the spectral content of a light source. The light source can be a source of light to be analyzed or a source composed of an array of individual semi-conductor lasers, either edge emitting or surface emitting with single mode or multimode spatially and spectrally or light emitting devices (LEDs) as described in U.S. Pat. No. 5,691,989.

In one embodiment, the gratings are made (or recorded) by the interference of two light beams. We call this method holographic. The angle between both beams and other parameters determines the period of the grating and hence the wavelength that has to be selected. Since the filter contains several gratings with different periods, the holographic material has to be illuminated by multiple pairs of beams at different positions over the material. In the case of the continuous grating, the holographic material is illuminated by a pair of beams which are both divergent in the direction corresponding to the grating variation and collimated in the orthogonal direction.

To record the gratings simultaneously two different recording techniques can be used:

1) A first plane wave reflects off a first mirror stack and a second plane wave reflects off a second mirror stack. The mirror stack is made of individual mirrors that are piled together with the required angle difference. The relative angle between each successive mirror is determined by the required channel spacing.

2) In another embodiment, the gratings are recorded by a phase masking method.

To record the continuous grating, a number of different recording techniques can be used:

In one embodiment, a first plane wave is made divergent in one direction by an optical system, which can be made out of cylindrical lenses, for example. However, other types of lenses may be used as well. The divergent wave is split into two waves by a beam splitter (the beam splitter can also be placed in the collimated beam and the same optical system for creating the divergent beam can be used for each of the two waves ). Each of the waves reflect off a planar mirror and interfere in the holographic material. The angular adjustment of the mirrors determines the center wavelength of the continuous grating whereas the amount of divergence determines the tuning range.

In another embodiment, the collimated beam is split into two collimated beam that are reflected by mirrors with cylindrical curvature.

In another embodiment, the gratings are recorded by a phase masking method whereby the phase mask has a continuously varying period.

BRIEF DESCRIPTION OF THE DRAWINGS

These and other features, aspects and advantages of the present invention will become better understood with regard to the following description, appended claims and accompanying drawings where:

FIG. 11 shows the relationship between the angle measurements in grating recording according to an embodiment of the present invention.

FIG. 15 is a cross sectional diagram of a continuous grating.

DETAILED DESCRIPTION OF THE INVENTION

The invention is a discrete and continuous filter for tunable filter applications and spectral shaping of lasers and methods of producing such a filter. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Tunable Filter

The present invention provides the fabrication method of a discrete and continuous volume holographic grating. The term tunable filter means that more than one wavelength can be altered by the device (either the continuous or tunable grating) either sequentially or simultaneously.

Figure 1:
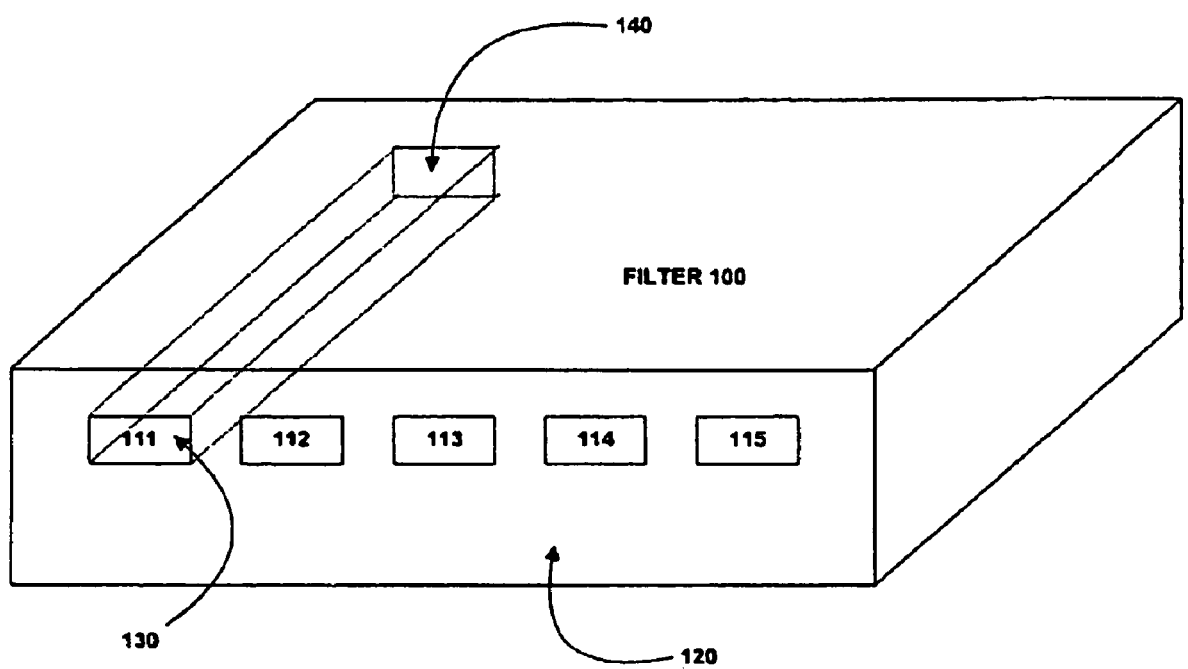
FIG. 1 is a diagram of a multi-channel tunable filter according to one embodiment of the present invention.

In one embodiment, the filter comprises a bank of gratings imprinted into a holographic material such as Lithium Niobate, photorefractive glass, polymer or any other suitable holographic material. In another embodiment, the filter comprises a continuously varying grating period imprinted into a holographic material such as Lithium Niobate photorefractive glass or polymer or any other suitable holographic material. With the discrete and continuous volume holographic gratings, only the matched wavelength is reflected off the gratings (i.e. the matched wavelength is dropped). The grating reflects light at the wavelength corresponding to the period defined by the position at which the beam is incident on the grating. In one embodiment, the separation of the channels can be set between 25 GHz and 200 GHz, which is the current standard in WDM channel spacing. In another embodiment, the spacing can be chosen arbitrarily. In yet another embodiment, the spacing is continuously varying along the lateral dimension of the volume holographic grating FIG. 1 shows an example of a multi-channel tunable filter according to one embodiment of the present invention. Filter 100 is a volume holographic grating having multiple gratings 111-115. Each grating occupies only a portion of a vertical area 120 of the filter 100. A lightwave carried by a fiber optic cable is collimated by standard optics (not shown). The parallel beam of light eventually reaches one of the gratings at a first side 130 of the grating. Then it propagates through the inside of the grating, exiting at a second side 140 of the grating.

Figure 2:
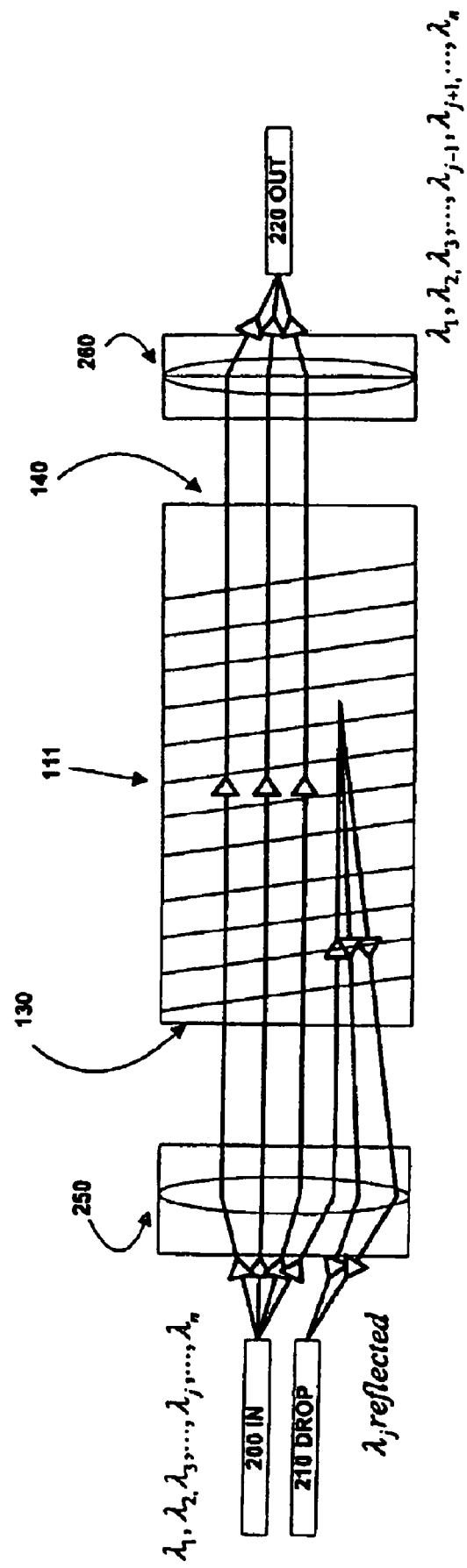
FIG. 2 is a cross-section diagram of a single grating.

FIG. 2 depicts cross section of grating 111. A light wave carrying wavelengths $\lambda_1, \lambda_2, \lambda_3, \ldots, \lambda_j, \ldots, \lambda_n$ enters in side 130 and exits from side 140. The lightwave from fiber optic "IN" line 200 passes through collimator 250, which through standard optics realigns the lightwave into parallel rays. The parallel beam of light then enters into grating 111 at a first side 130. The grating is a periodic modulation of the medium's index of refraction. Its grating vector determines the orientation and the period length of the grating. For light beams with certain wave vectors the light wave fulfills the so-called Bragg condition and is diffracted in this case by the grating. That means that for a certain input angle of the light beam the light wave can only be diffracted for a certain wavelength. This effect is described in detail by Kogelnik's formula ("Coupled Wave Theory for Thick Holgram Gratings", H. Kogelnik, Bell Syst. Tech. J., 48, 2909 (1969)).

The effect of the periodic index modulation is similar to a series of partially reflecting mirrors. In one embodiment, there are around sixty-thousand partial mirrors in each grating. (The present invention is not limited to a specific number of partially reflecting mirrors, this figure is given by way of example only). In the figure, the partially reflecting mirrors are represented by the slanted lines in grating 111. In one embodiment, the partial mirrors are optically engraved in the material. By spacing the partial mirrors correctly (the period of the grating), an optical condition is created wherein only one wavelength is totally reflected off the grating. In grating 111, $\lambda_j$ is reflected off the grating while all other wavelengths are allowed to pass through and exit through side 140. Collimator 260 then directs the pass-through wavelengths to the "OUT" line 220. The reflected $\lambda_j$ is directed to a "DROP" line 210.

Each grating has a different optical condition caused by a different spacing of the partial mirrors. Hence each grating reflects a different wavelength. Referring back to filter 100 of FIG. 1, the desired wavelengths can be reflected (i.e. dropped) by directing the light through the appropriate grating.

Alternatively the system can be used to add a wavelength as well. Instead of the drop line 210 being a receiving node, it can be a sending node. Its output is provided to the filter block where it is reflected back to combine with wavelengths traveling through the filter in the opposite direction. In such a system the 220 out fiber would be an input fiber and the 200 in fiber would be an out fiber, carrying the original wavelengths and the added wavelength.

In another embodiment of the present invention, grating 111 (and all other gratings in the filter) is configured to only allow $\lambda_j$ to pass through the filter. This embodiment operates in the opposite manner as depicted in FIG. 2. $\lambda_j$ in this embodiment passes through and exits on side 140 to collimator 260. All other wavelengths coming through collimator 250 are reflected. Thus each grating can extract a specific wavelength.

In another embodiment of the present invention, instead of filtering out only one wavelength, multiple wavelengths can be filtered at the same location. To accomplish this, multiple gratings are superimposed in the same volume. When light passes through the grating, multiple wavelengths are filtered at the same time.

A cross section of a continuously varying grating is illustrated in FIG. 15. A cross section of a grating showing a holographic grating extending from point A to point B is shown. The continuously varying wavelength is illustrated as increasing in wavelength from the value at point A to the value at point B. The example shows a linearly continuously varying wavelength. However, the continuously varying wavelength could be of any profile, including exponential or any other continuously varying profile.

Optical Read-Head

Figure 3:
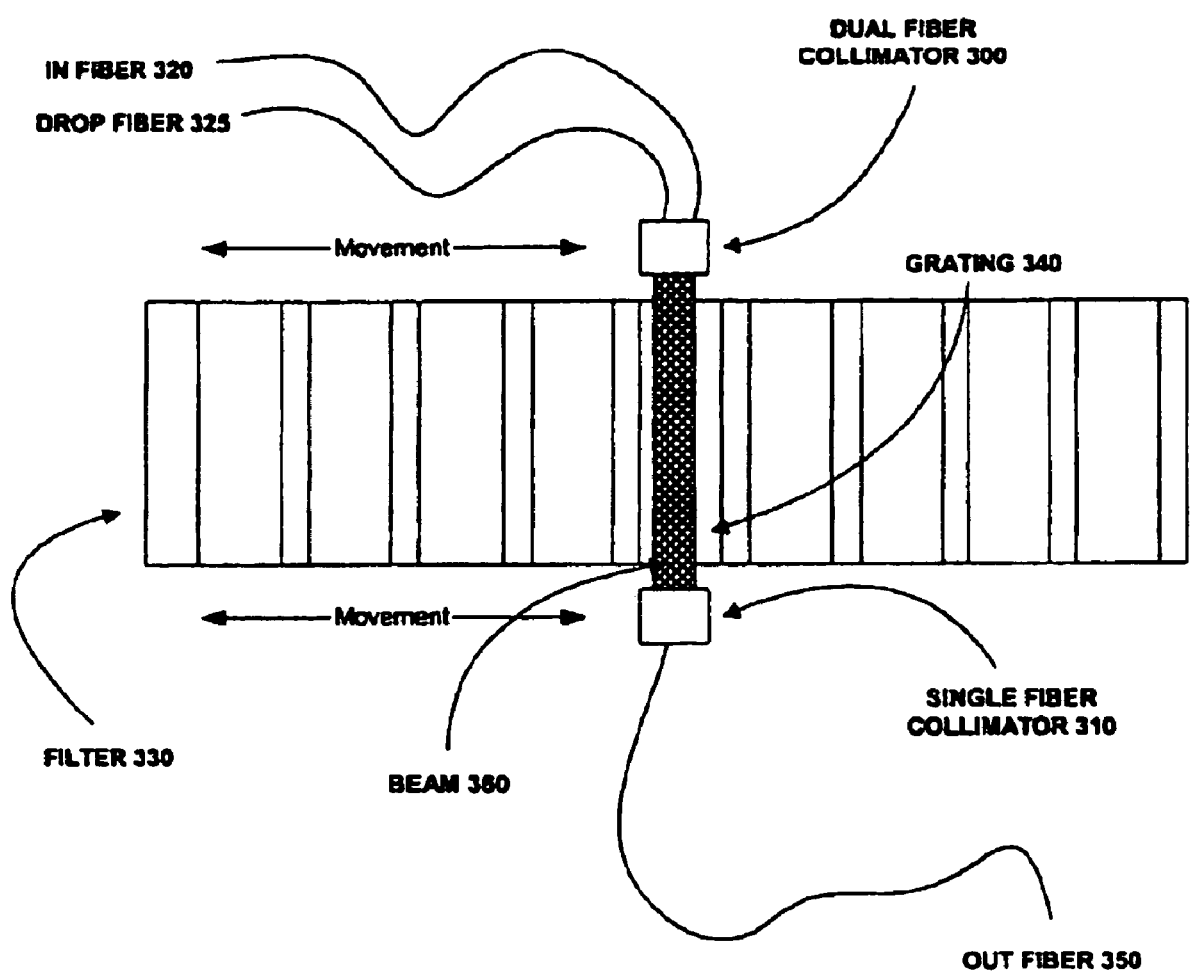
FIG. 3 is a diagram of an optical read-head according to one embodiment of the present invention.

In one embodiment, an optical read-head comprising a dual fiber collimator and a single fiber collimator is configured to extract or drop one of the wavelengths from an optical fiber carrying multiple wavelengths by passing light through an appropriate grating. FIG. 3 shows an optical read-head according to one embodiment of the present invention. The read-head comprises a dual fiber collimator 300 and a single fiber collimator 310 (The dual fiber collimator is presented as an example embodiment, the invention can also be practiced, for example, with two single fiber collimators side by side). The collimators comprise fibers, with the tip of the fibers placed in front of a lens at its focal plane. The light that exits the fiber is spherical. When it reaches the lens, it is collimated at the lens and exits the lens as a parallel beam of light.

The collimated light beam 360 from collimator 300 carries multiple wavelength channels. A specific desired wavelength channel is reflected from the specific grating 340 (gratings denoted by parallel lines) and directed into either the input "IN" fiber 320 or in the "DROP" fiber 325 of the dual fiber collimator 300 (Use of the dual fiber collimator avoids having the dropped wavelength going back into the same fiber. This configuration avoids the need to use a circulator to extract the light beams traveling in opposite directions. This is a disadvantage of prior art Fiber Bragg grating, which requires the circulator, because a circulator is an expensive component. Directing the light into another fiber is accomplished in the present invention by slanting the grating slightly, as shown in the equations and drawings, in order to avoid the Fresnel reflection from the entrance face of the material). All remaining channels minus the reflected wavelength channel are received and coupled to output "OUT" fiber 350 by the single fiber collimator. The beam size is smaller than the grating width to read out only one grating at a time, respectively. In one embodiment, each grating in the filter 330 is 0.9 millimeters wide and the beam size is 0.5 millimeters. Note, that the size of each grating as well as the beam size can vary to pack more or less gratings. (Note also that multiple overlapping gratings can be placed at the same location and slanted differently so that multiple reflected wavelengths can be captured by multiple collimators.)

In other embodiments, the spacing of the gratings can vary continuously across the filter. In this arrangement, the spacing between the gratings can increase or decrease across the filter in a continuous way, such as described in U.S. Pat. No. 5,189, 532. The read-head moves horizontally across the filter to select the appropriate grating to drop a desired wavelength channel. In another embodiment of the present invention, the optical read-head is comprised of two dual fiber collimators (such as where, for example, one is for drop and one is for add).

Hitless Architecture

The filter of one embodiment of the invention is three dimensional and is divided into an upper and a lower region. The upper region contains the different gratings used to select a certain wavelength. The lower region does not contain any gratings. Hence the optical read head can move in the lower region horizontally in a hitless manner without interrupting light beams. To tune the system to a different channel the optical head is configured to first move in a vertical direction from the upper region to the lower region. Then it moves horizontally in the lower region of the filter to the position above which the material contains the desired grating. Afterwards the optical read head is moved in a vertical direction from the lower to the upper region again into the grating region.

Figure 4:
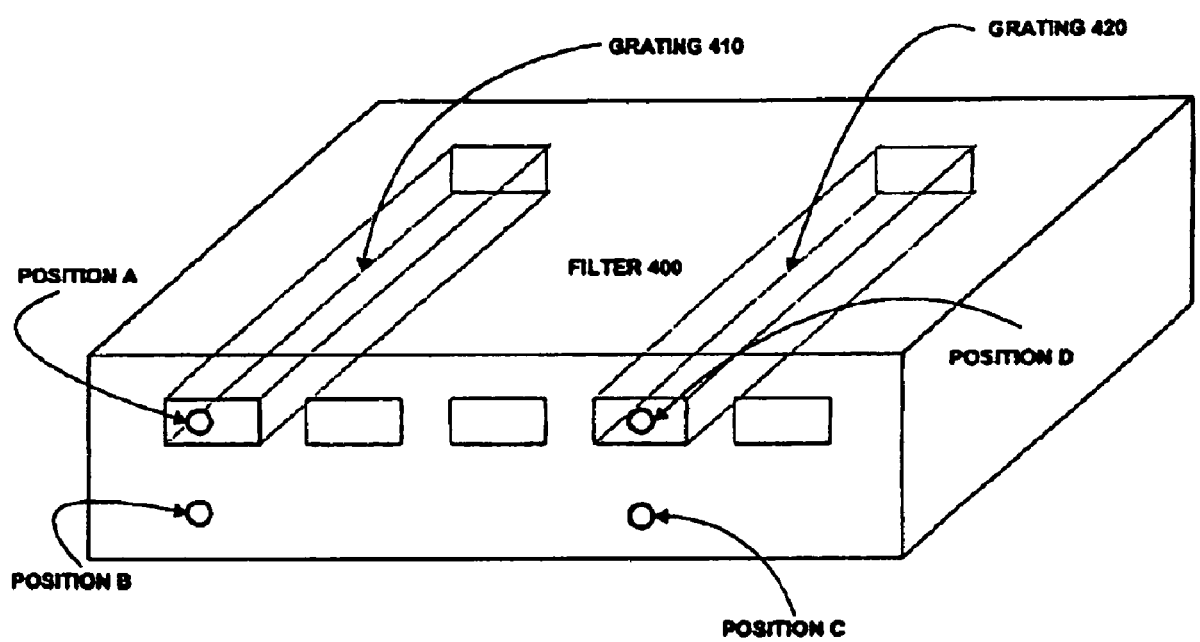
FIG. 4 shows a multi-channel tunable filter configured to operate in a hitless manner according to one embodiment of the present invention.

The tuning of the filter usually is accomplished within hundreds of milliseconds and no data traffic is lost or interrupted as a result of the move. FIG. 4 provides an example of this embodiment of the present invention. Consider an example where an optical read-head (not shown) is currently in position A on filter 400. At this position, a wavelength that grating 410 is configured to reflect for adding or dropping from a fiber. If at some point another wavelength is desired to be added or dropped, the optical read-head moves as follows. First, the optical read-head moves vertically with respect to filter 400 to position B in the lower region of the filter. At position B, no grating exists, so no wavelength channels are reflected. Next, the head moves horizontally in the lower region with respect to filter 400 to position C. Then, the read-head moves vertically again to position D in the upper region, positioned at a grating that reflects a different wavelength. At this position, a different wavelength is added or dropped from the fiber, wherein the reflected wavelength is one for which grating 420 has been configured. At the time that the read-head moves horizontally, no light is passed through any grating, which makes the architecture hitless. To achieve such functionality, all gratings are located close to the surface of the filter. (It should be noted that the invention can provide a tunable, but blocking, filter by not providing or using the lower region. In the blocking implementation, moving the filter over one or more gratings on the way to a desired grating results in temporary affect on the wavelengths reflected by the intermediate filters.)

In one embodiment, the filter itself is a holographic material, and may be comprised, for instance, of Lithium Niobate. In another embodiment, the filter is a thin-film filter and behaves as a band pass filter, allowing only the desired wavelength to pass through and reflecting all other wavelengths. In one embodiment of the present invention, the optical read-head is fixed and the filter moves to accomplish the same hitless effect.

Figure 5:
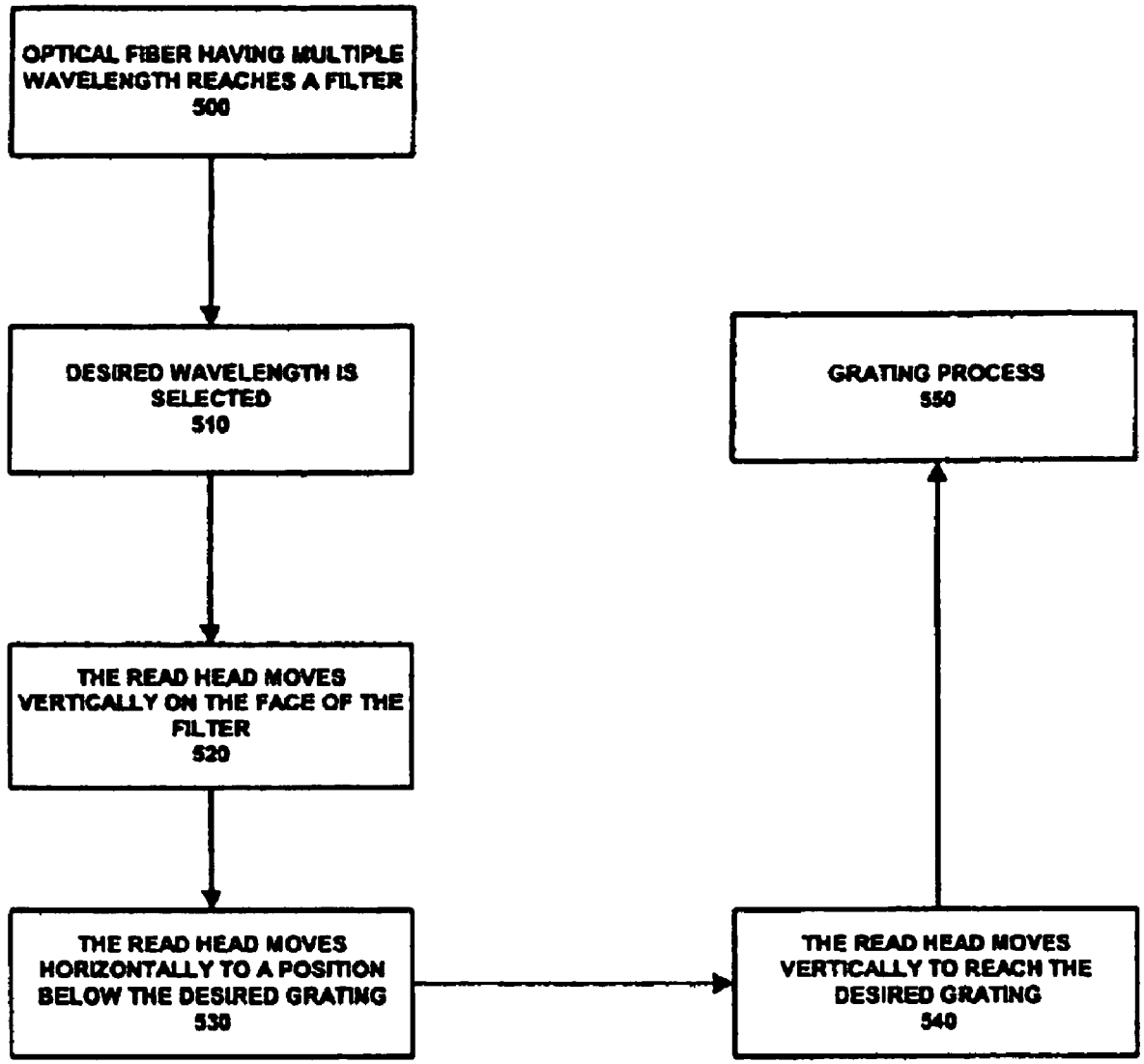
FIG. 5 is a flowchart showing the operation of a multi-channel tunable filter configured to operate in a hitless manner according to one embodiment of the present invention.

FIG. 5 is a flowchart showing the operation of a tunable filter according to one embodiment of the present invention. At block 500, an optical fiber having multiple wavelengths of light reaches a filter. At block 510, a desired wavelength is selected. At block 520, the read-head moves vertically on the face of the filter until the grating. Next, it moves horizontally to a position below the desired grating at block 530. Then, it moves vertically again to reach the grating at block 540. At block 550 the light wave is passed through the grating.

Figure 16:
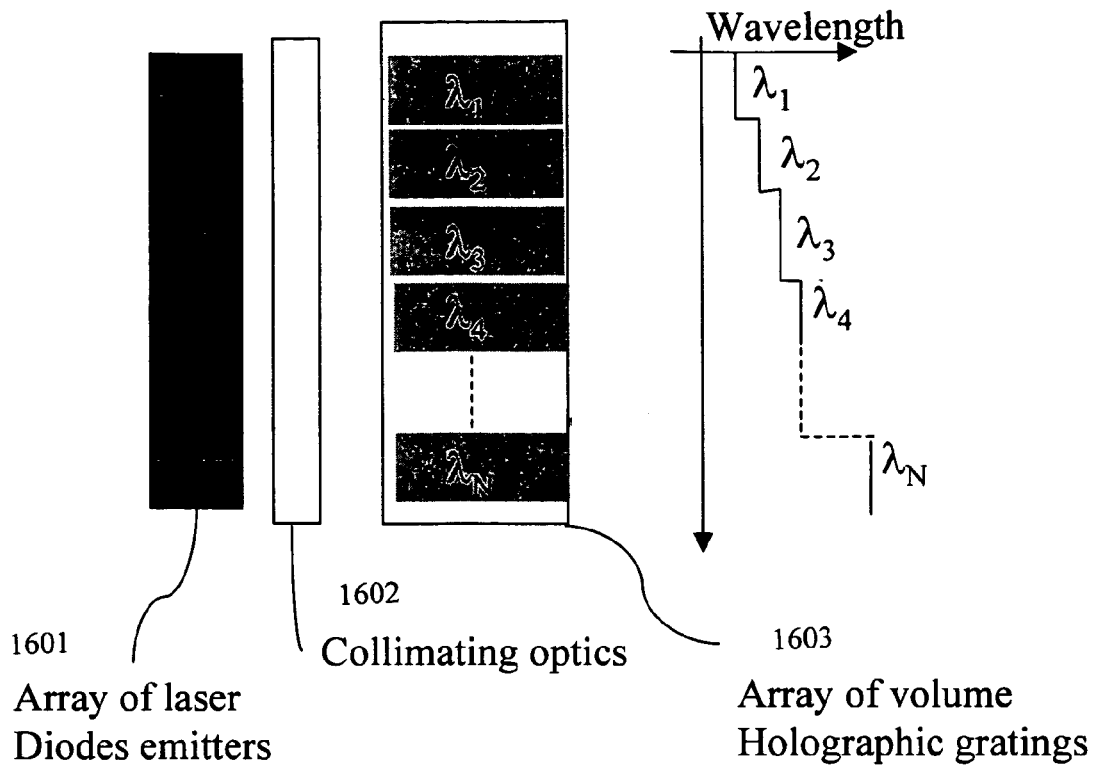
FIG. 16 is illustrates a multi-channel volume holographic grating positioned adjacent a laser array.

FIG. 16 illustrates a multi-channel volume holographic grating positioned in front of an array of semi-conductor lasers. The lasers may be single mode or multimode (spatially). The laser diode emitters 1601 are disposed adjacent to a collimating lens 1602 that directs the output of each laser onto a region of an array of volume holographic gratings. Each region is a different wavelength with discrete changes in wavelength along the array. As can be seen in FIG. 16, the output is a stepped wavelength profile from the shortest wavelength to the longest.

Figure 17:
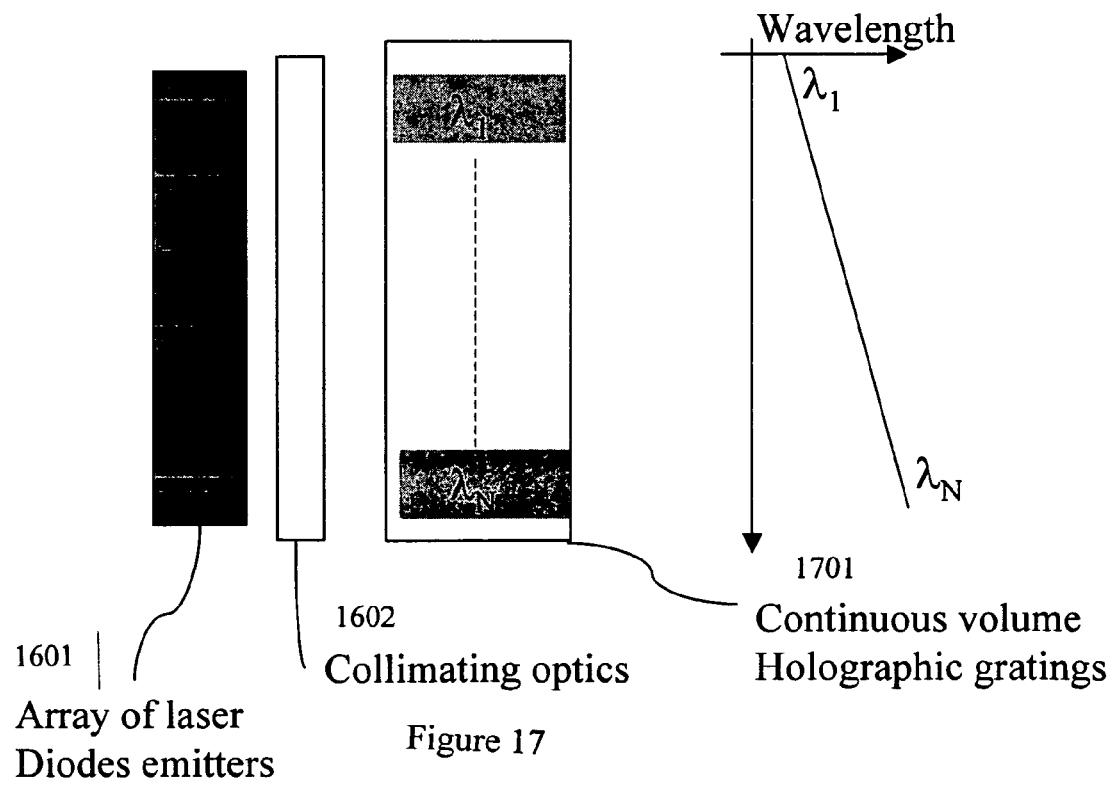
FIG. 17 illustrates a continuous volume holographic grating positioned adjacent a laser array.

FIG. 17 illustrates a system similar to FIG. 16 but with the array replaced with a continuously varying holographic grating 1701. As can be seen, the stepped output wavelength profile of FIG. 16 is now a continuously varying wavelength profile from the shortest wavelength to the longest.

Grating Recorder

In one embodiment, the gratings are made (or recorded) by the interference of two beams. A first plane wave reflects off a first mirror stack and a second plane wave reflects off a second mirror stack. The mirror stack is made of individual mirrors that are piled together with a given angle difference. The relative angle between each successive mirror is determined by the required channel spacing.

Figure 6:
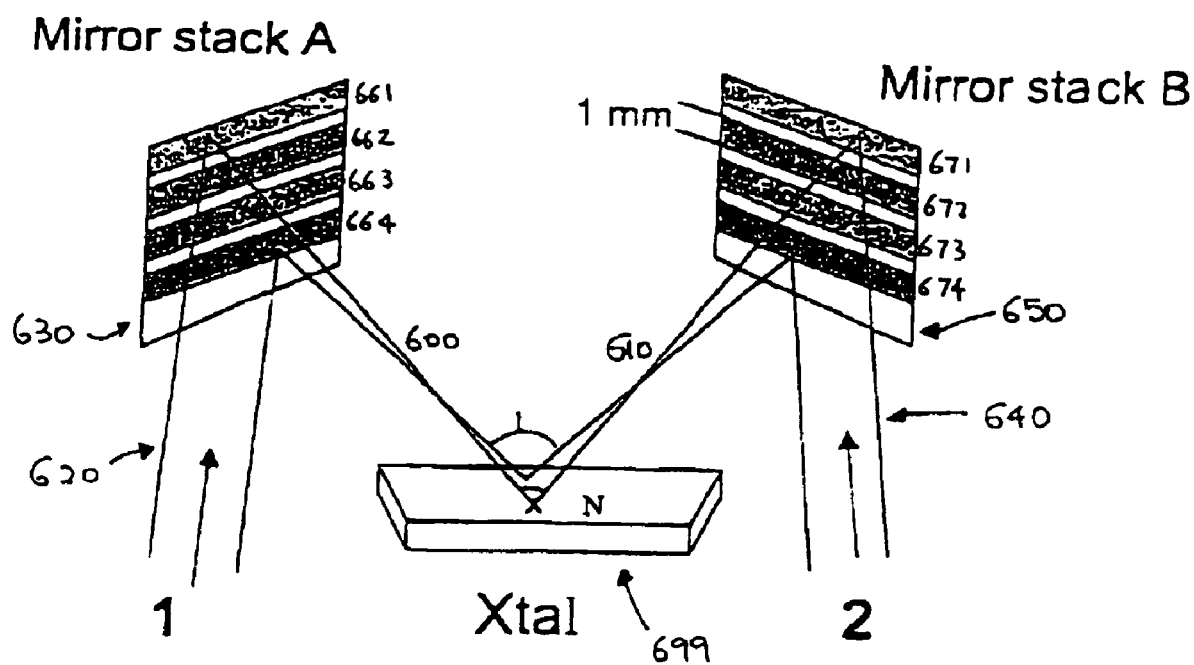
FIG. 6 shows a configuration for recording gratings according to one embodiment of the present invention.

FIG. 6 shows a configuration for recording gratings according to one embodiment of the present invention. The gratings are recorded in transmission geometry by the interference of two beams 600 and 610. The (wavelength of the)

beams, in one embodiment, are 514 nm or 532 nm. (The above are given by way of example only, the present invention can be implemented with different holographic materials working with different illumination wavelengths. Even, for example, Lithium Niobate light wavelength from the visible wavelength region (maximum at 477 mn) may be used to record the gratings. This depends on the sensitive wavelength region of the material that can be used for recording.)

A first plane wave 620 reflects off a first mirror stack 630 onto recording material 699. Recording material 699 is comprised of a holographic material. A second plane wave 640 reflects off a second identical mirror stack 650 onto recording material 699. In one embodiment, each mirror stack 630 and 650 is comprised of individual mirrors 661-664 and 671-674 that are piled together at a given angle difference. The relative angle between each of the successive mirrors is determined by the required filter channel spacing (e.g. 25, 50, 200 GHz). In another embodiment (not shown) the stack is made by diamond turning a block of metal.

In one embodiment, the continuously varying gratings are made (or recorded) by the interference of two diverging beams. A first diverging beam wave reflects off a planar mirror and a second plane wave reflects off a second planar mirror. The diverging beams are created with a set of cylindrical lenses. Along the location of the volume holographic material, the relative angle between the two interfering beams varies and therefore produces a continuous change in grating period.

Figure 18:
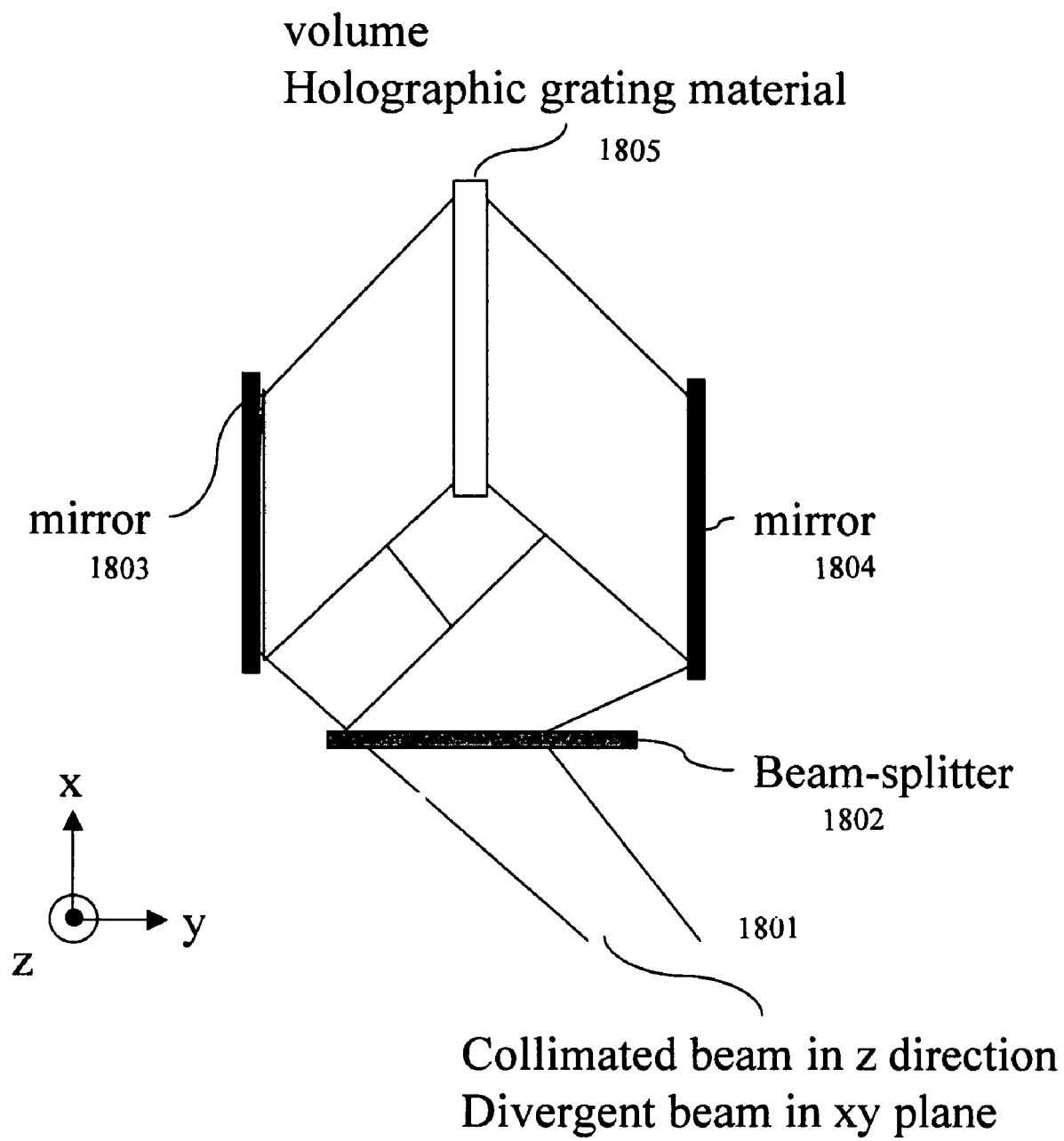
FIG. 18 illustrates one embodiment for recording a continuously frequency varying holographic grating.

FIG. 18 shows a configuration for recording gratings according to one embodiment of the present invention. The gratings are recorded in reflection geometry. A first beam 1801 which is collimated in the z direction and diverging in the xy plane (by an arrangement of cylindrical lenses for example) is split into two beams by beam splitter 1802.

The two beams are reflected off planar mirrors 1803 and 1804 and interfere at the position of the volume holographic material 1805.

Figure 20:
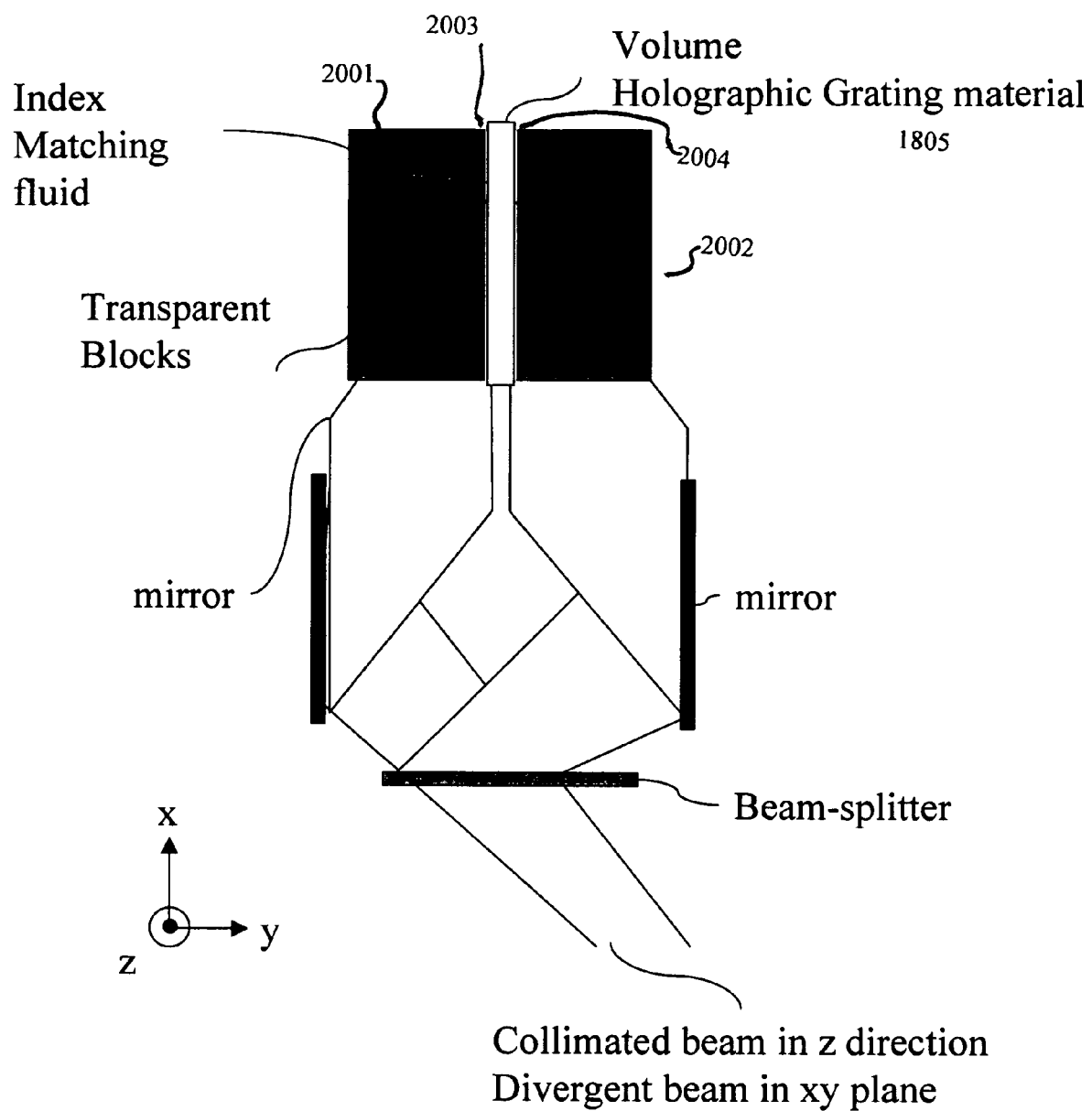
FIG. 20 illustrates an alternative embodiment of the method of FIG. 18.

FIG. 20 illustrates an alternative embodiment of the method of FIG. 18. In this embodiment, the holographic material is disposed between transparent blocks 2001 and 2002. Index matching fluid layers 2003 and 2004 are disposed between the holographic material 1805 and the transparent blocks 2001 and 2002 respectively. In an embodiment of the invention, the index of the fluid approximately matches that of the transparent blocks and the holographic material 1805.

Figure 19:
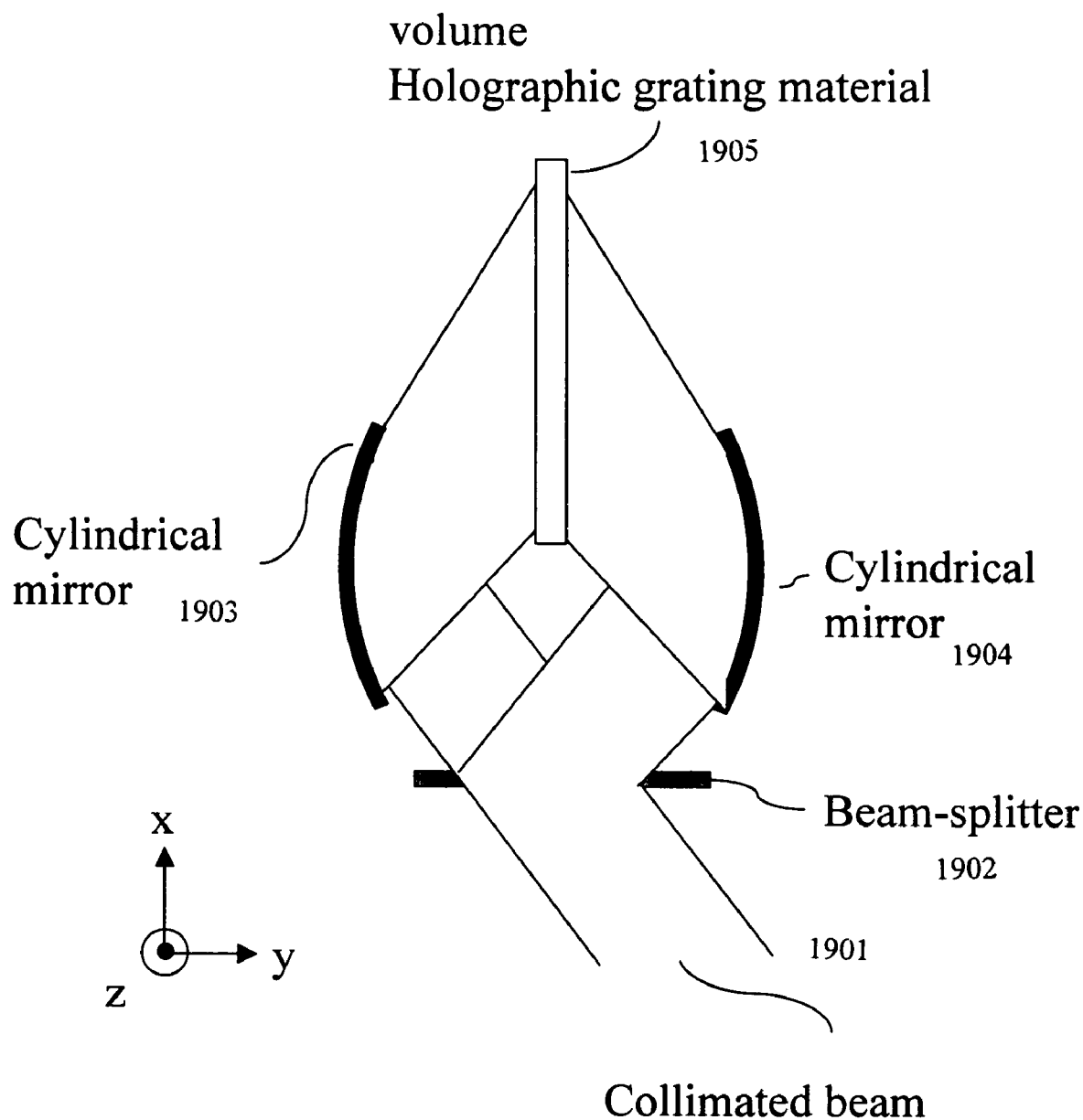
FIG. 19 illustrates another embodiment for recording a continuously frequency varying holographic grating.

FIG. 19 shows a configuration for recording gratings according to one embodiment of the present invention. The gratings are recorded in reflection geometry. A first beam 1901 that is collimated in all directions is split into two beams by beam splitter 1902.

The two beams are reflected off cylindrical mirrors (with curvature in x-y plane) 1903 and 1904 and interfere at the position of the volume holographic material 1905.

Figure 21:
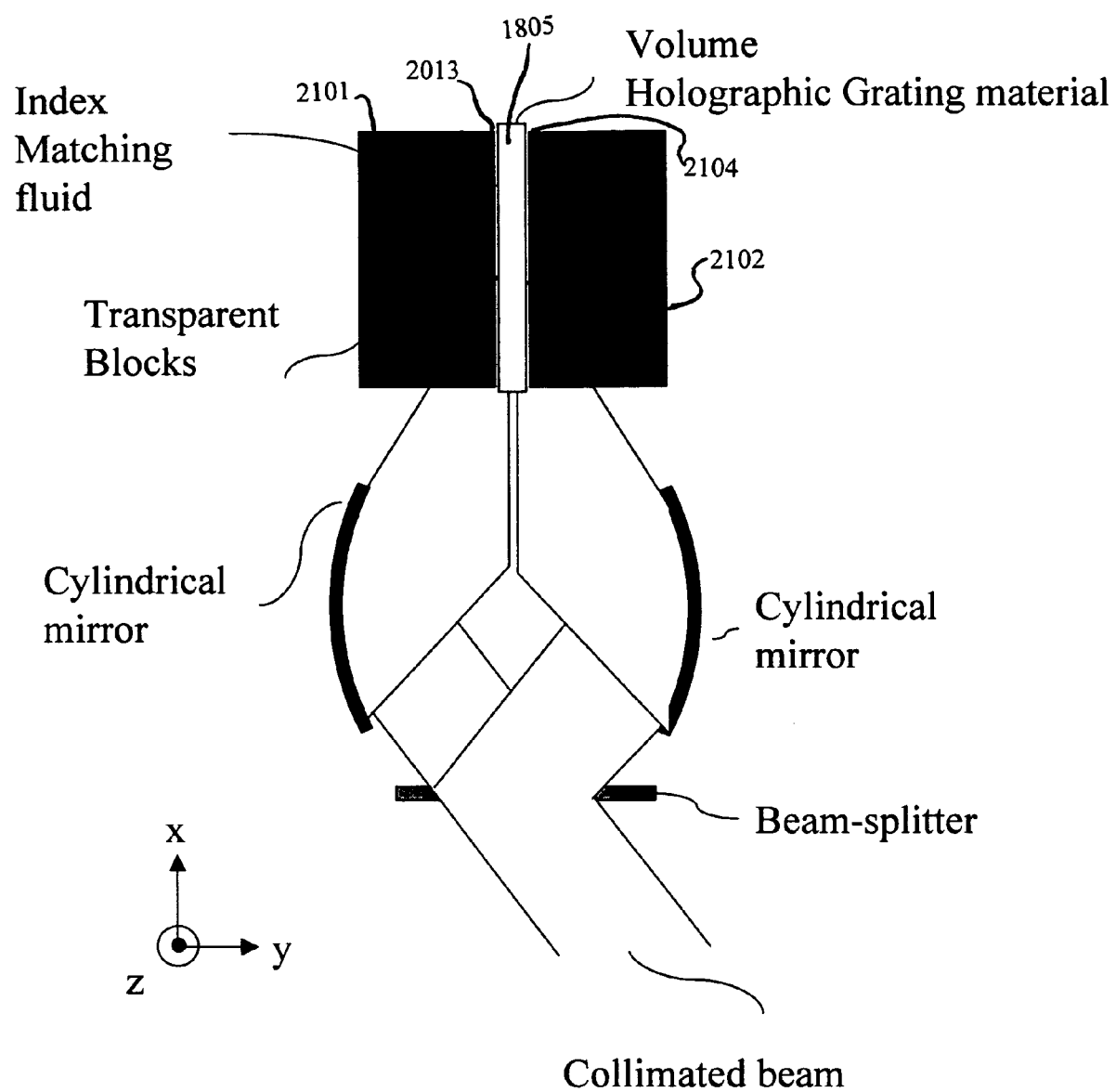
FIG. 21 illustrates an alternative embodiment of the method of FIG. 19.

FIG. 21 illustrates an alternative embodiment of the method of FIG. 19. In this embodiment, the holographic material is disposed between transparent blocks 2101 and 2102. Index matching fluid layers 2103 and 2104 are disposed between the holographic material 1805 and the transparent blocks 2101 and 2102 respectively. In an embodiment of the invention, the index of the fluid approximately matches that of the transparent blocks and the holographic material 1805.

Figure 7:
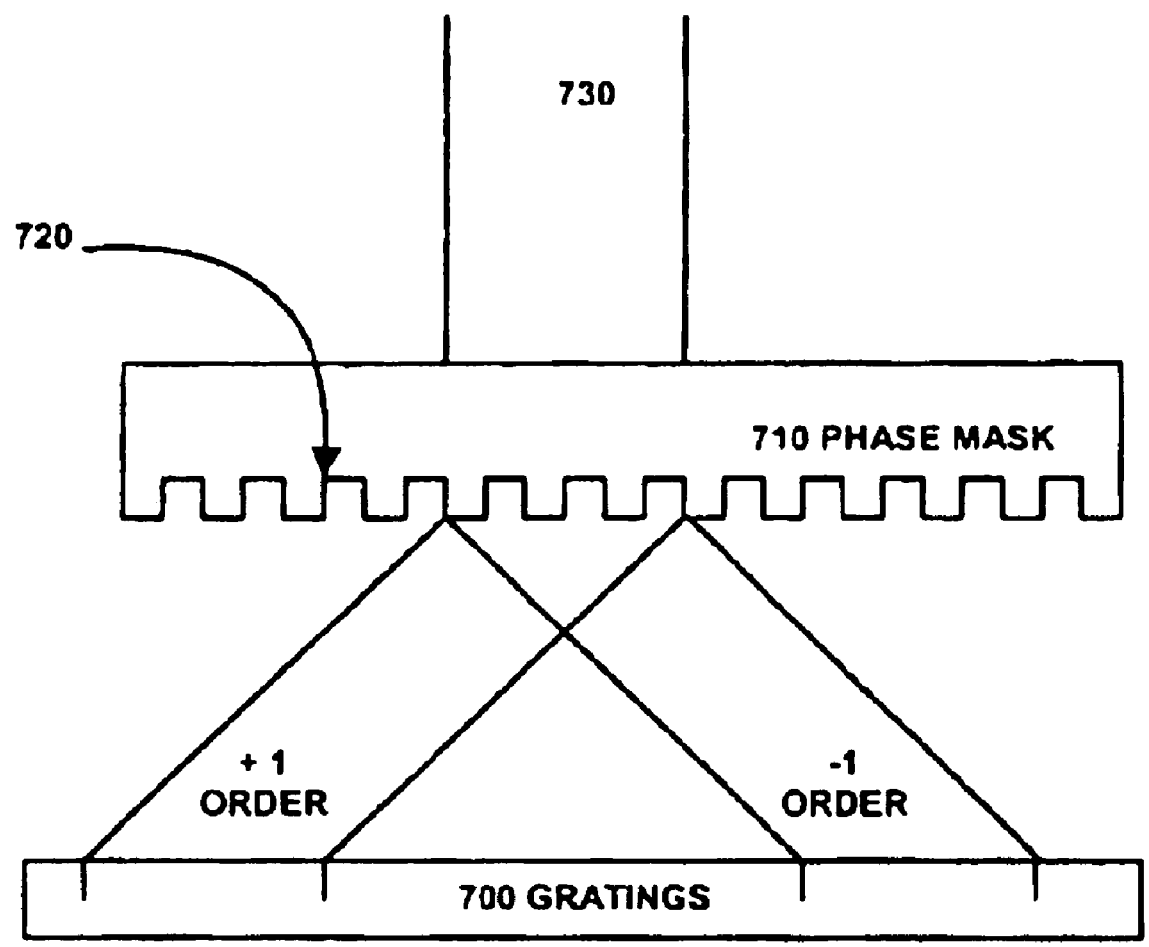
FIG. 7 shows a configuration for recording gratings according to another embodiment of the present invention.
Figure 8:
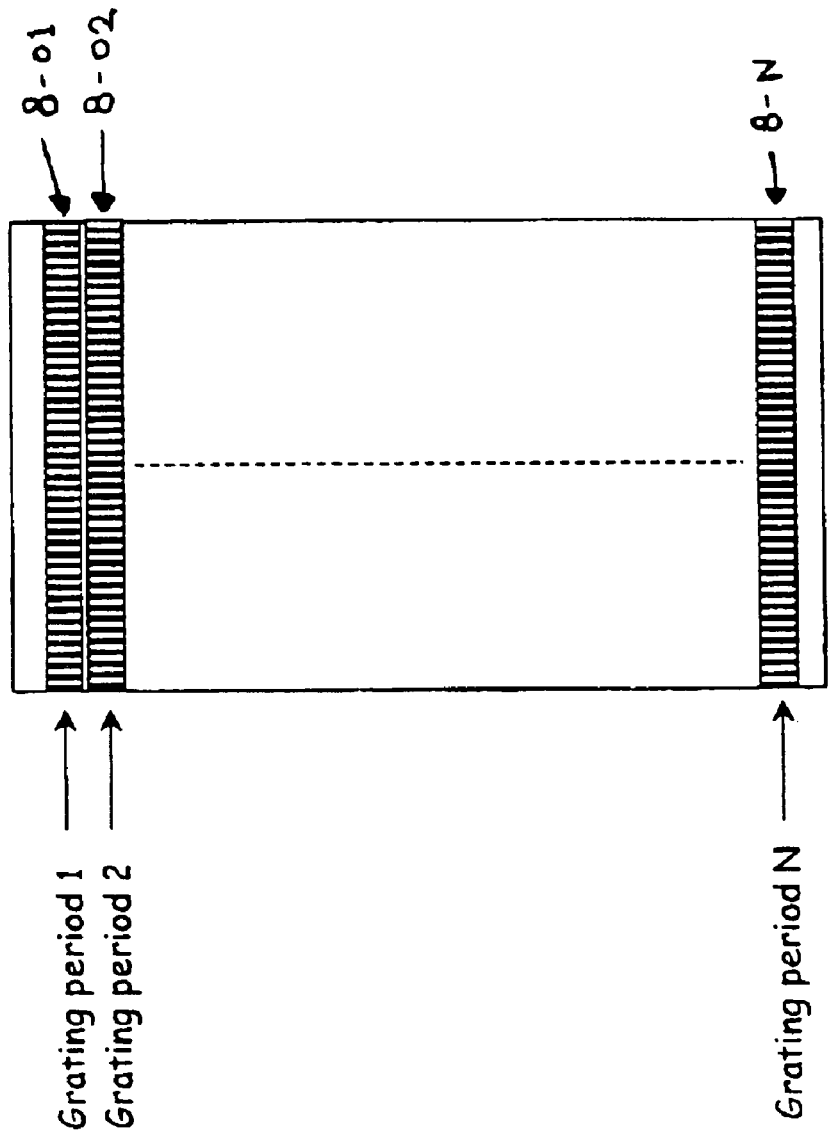
FIG. 8 illustrates the phase mask design of one embodiment of the present invention.

FIG. 7 depicts the recording process according to another embodiment of the present invention. Grating 700 is etched by electron beam or by holographic technique. The phase mask design is shown in FIG. 8. It consists of multiple binary relief gratings 8-01, 8-02, up to 8-N, each with a different period positioned side by side on a single substrate. Dimensions of each grating can be for example 50 mm long by 1 mm wide. The relief grating can be made by e-beam lithography or by holographic techniques. Depending on the wavelength of illumination and the period of the relief grating, the zero order (part of the incident light not diffracted by the grating) can be significant and will reduce the modulation depth of the resulting recorded volume holographic grating, thus reducing the maximum achievable index variation.

Figure 9:
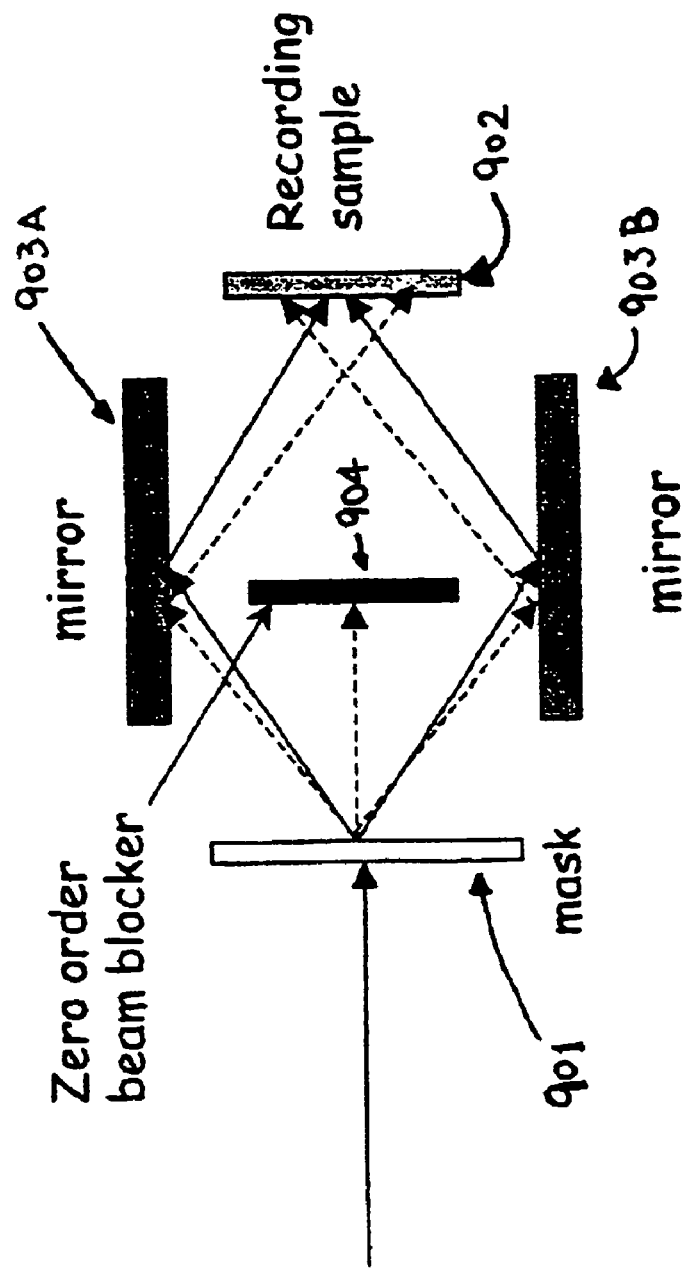
FIG. 9 illustrates a far field recording scheme.

Two recording schemes that can alleviate this problem are presented. In FIG. 9, a far field approach is used. The holographic medium 902 is placed "far" from the phase mask 901. The +1 and −1 diffracted orders are reflected by a pair of mirrors 903A and 903B that recombine the beams at the recording medium. A beam blocker 904 is positioned between the phase mask 901 and recording medium 902 to block the zero order and pass the +1 and −1 diffracted orders.

Figure 10:
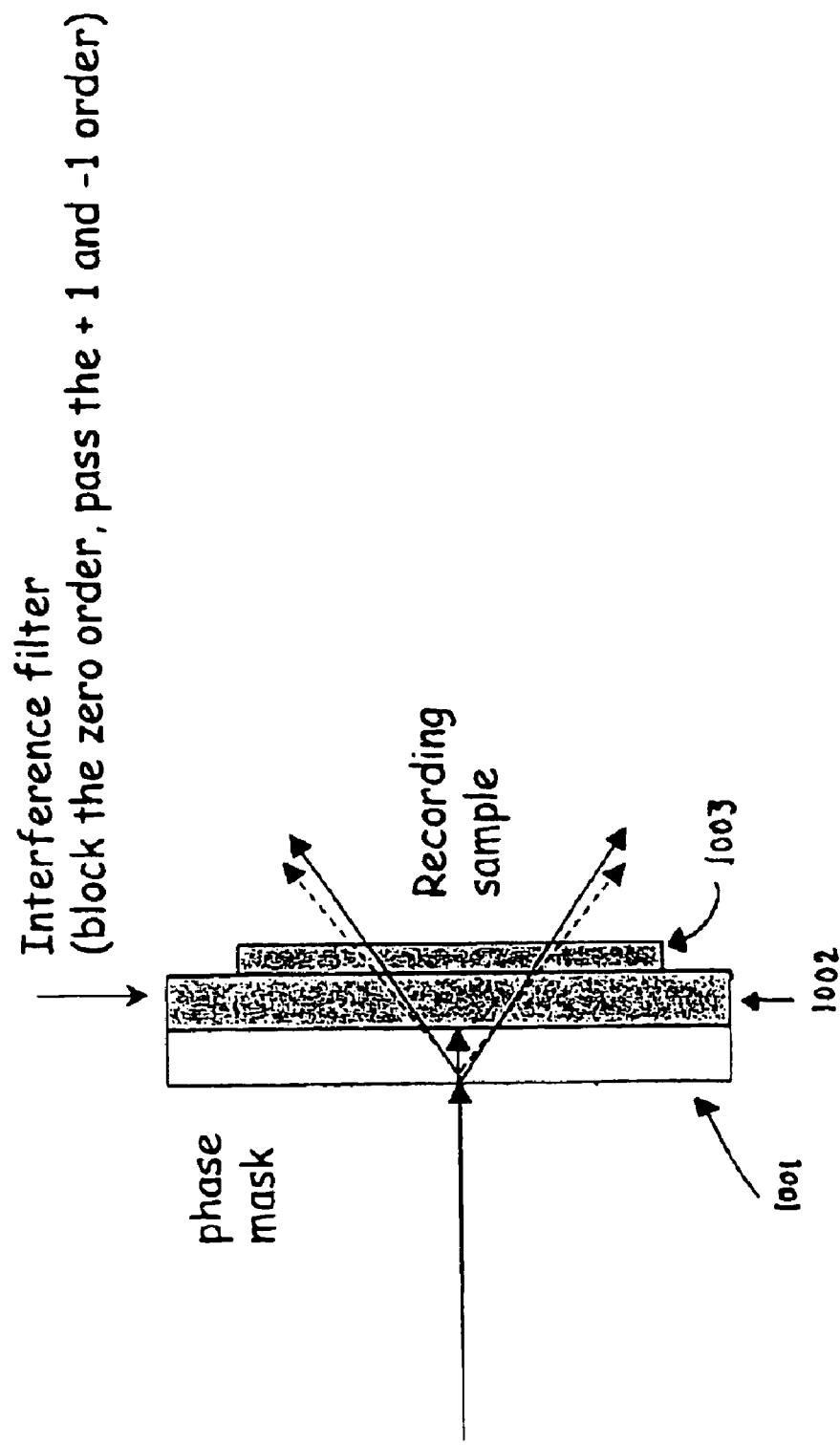
FIG. 10 illustrates a near field recording scheme.

A near field approach is shown in FIG. 10. In this implementation, an interference filter 1002 is sandwiched between the phase mask 1001 and the recording medium 1003. The interference filter is a standard thin film coating. It is designed to reflect the zero order beam and to pass the +1 and −1 order beam. The thickness of the interference filter 1002 is in the order of 2 mm.

It may happen that part of the light that is reflected by the interference filter enters the phase mask again and is diffracted in such a way that additional beams arise that propagate almost parallel to the +1 and −1 order recording beams. To avoid this undesired effect in one embodiment an optical diode comprising of, e.g., an element that rotates the light polarization and a polarizer, is placed between the phase mask 1001 and the interference filter 1002.

Equations and Angle Values

The equations refer to the volume holographic gratings. FIG. 11 shows the labeling of specific angles and measurement within an embodiment of grating recording. The following equations are based on the labeling and definition given by FIG. 11.

$$\epsilon = \alpha + \beta \quad (1)$$

$$\sin(\alpha) = n_R \sin(\alpha) = n_R \sin(\epsilon/2 - \delta) \quad (2)$$

$$\sin(\beta) = n_R \sin(\beta) = n_R \sin(\epsilon)2 + \delta) \quad (3)$$

Equation (1), (2) and (3) describe the relationship between angles. Based on these three equations, we derive equation (4), which describes how to obtain the value of the full angle between the input collimated beam and the diffracted beam in air:

$$\epsilon = \arcsin[n_R \sin(\epsilon/2 - \delta)] + \arcsin[n_R \sin(\epsilon/2 + \delta)] \quad (4)$$

In one embodiment (using this angle, but other angles may be used as well) using equation (4) and knowing $\delta = 0.2°$, where $n_R = 2.211 \pm 0.001$ (for dispersion consideration)

the angle is given by $\epsilon = (2.97 \pm 0.05)°$.

Equations (5) to (7) are related to the grating period:

$$K^2 = k_{in}^2 + k_{out}^2 - 2k_{in}^2 k_{out}^2 \cos(\pi - \tilde{\alpha} - \tilde{\beta}) \quad (5)$$

$$K^2 = k_{in}^2 + k_{out}^2 - 2k_{in}^2 k_{out}^2 \cos(\tilde{\epsilon}) \quad (6)$$

$$\left(\frac{2\pi}{\Lambda_G}\right)^2 = 2\left(\frac{2\pi n_R}{\lambda_R}\right)^2 [1 + \cos(\tilde{\epsilon})] \quad (7)$$

These three equations yield equation (8), which describes how to obtain the value of the grating period of the refractive index pattern at room temperature.

$$\Lambda_G = \frac{\lambda_R}{n_R\sqrt{2[1+\cos(\tilde{\varepsilon})]}} \quad (8)$$

One embodiment of the present invention also takes into consideration of the impact of thermal expansion on the grating period of the refractive index pattern. At 180° C., we have:

$$\Lambda_G^H = \Lambda_G\sqrt{(1+a_z\Delta T)^2\cos^2(\tilde{\delta}) + (1+a_y\Delta T)^2\sin^2(\tilde{\delta})} \quad (9)$$

where $\alpha_z = 4.5\cdot 10^{-6} K^{-1}$; $\alpha_y = 1.5\cdot 10^{-5} K^{-1}$; $\Delta T = 155$ K.

(Note that these specific values are that of $LiNbO_3$ only, other material have different values)

This gives a method of finding the value of the grating period of the refractive index pattern at the recording temperature of 180° C. Using the same constants, equation (10) gives the slant angle of the grating vector in the crystal at 180° C.:

$$\tilde{\delta}_H = \arcsin\left[\frac{\Lambda_G(1+a_y\Delta T)\sin(\tilde{\delta})}{{}^H\Lambda_G}\right] \quad (10)$$

which yields the result of $\tilde{\delta}_H = 0.2002° \approx \tilde{\delta}$.

The slant angle at 180° C. is similar to that at room temperature.

Figure 12:
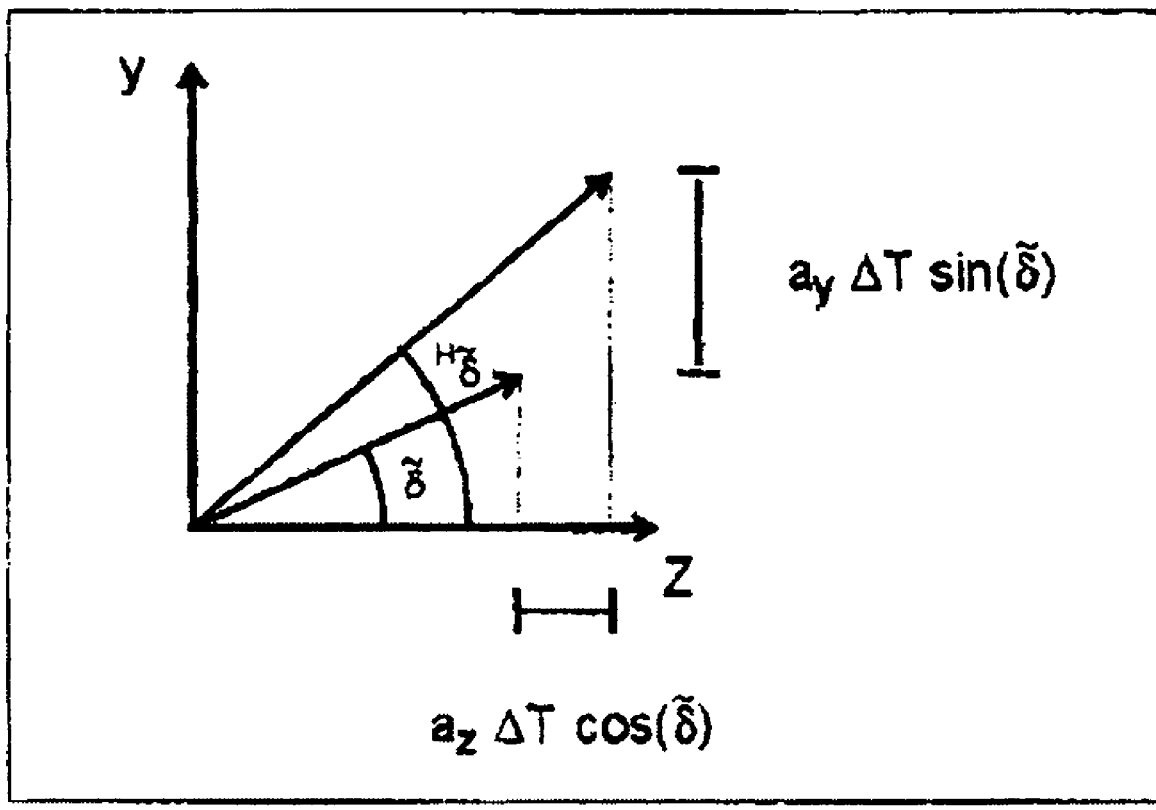
FIG. 12 shows the relationship between the direction of the input collimated beam and the grating vector inside the bulk material according to an embodiment of the present invention.

Finally, FIG. 12 depicts additional variables to show the relationship among the angles depicted in FIG. 11. Knowing the relationship allows us to solve for all angle values, which are:

$\epsilon = (2.97\pm 0.05)°$; $\tilde{\delta} = 0.2°$;
$\tilde{\epsilon} = (1.343\pm 0.023)°$;
$\tilde{\alpha} = \tilde{\epsilon}/2 - \tilde{\delta} \approx 0.4715°$; $\tilde{\beta} = \tilde{\epsilon}/2 + \tilde{\delta} \approx 0.87250°$;
$\alpha = \arcsin(n_R\sin(\tilde{\epsilon}/2 - \tilde{\delta})) \approx 1.0425°$;
$\beta = \arcsin(n_R\sin(\tilde{\epsilon}/2 + \tilde{\delta})) \approx 1.9272°$;
$\delta = (\beta - \alpha)/2 \approx 0.4424°$;

Experimental Results

Figure 13:
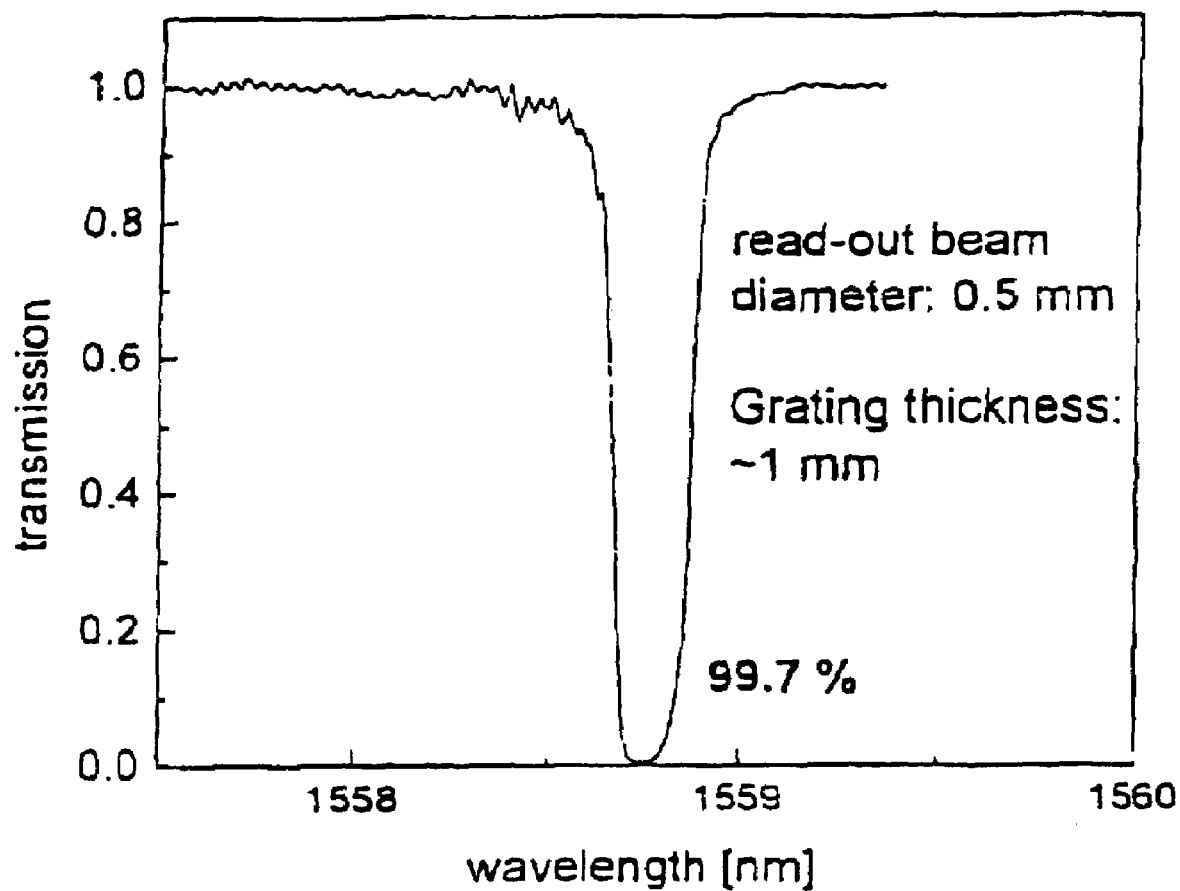
FIG. 13 shows experimental results and illustrates the filter shape and achieved reflected efficiency when an embodiment of the present invention is used.
Figure 14:
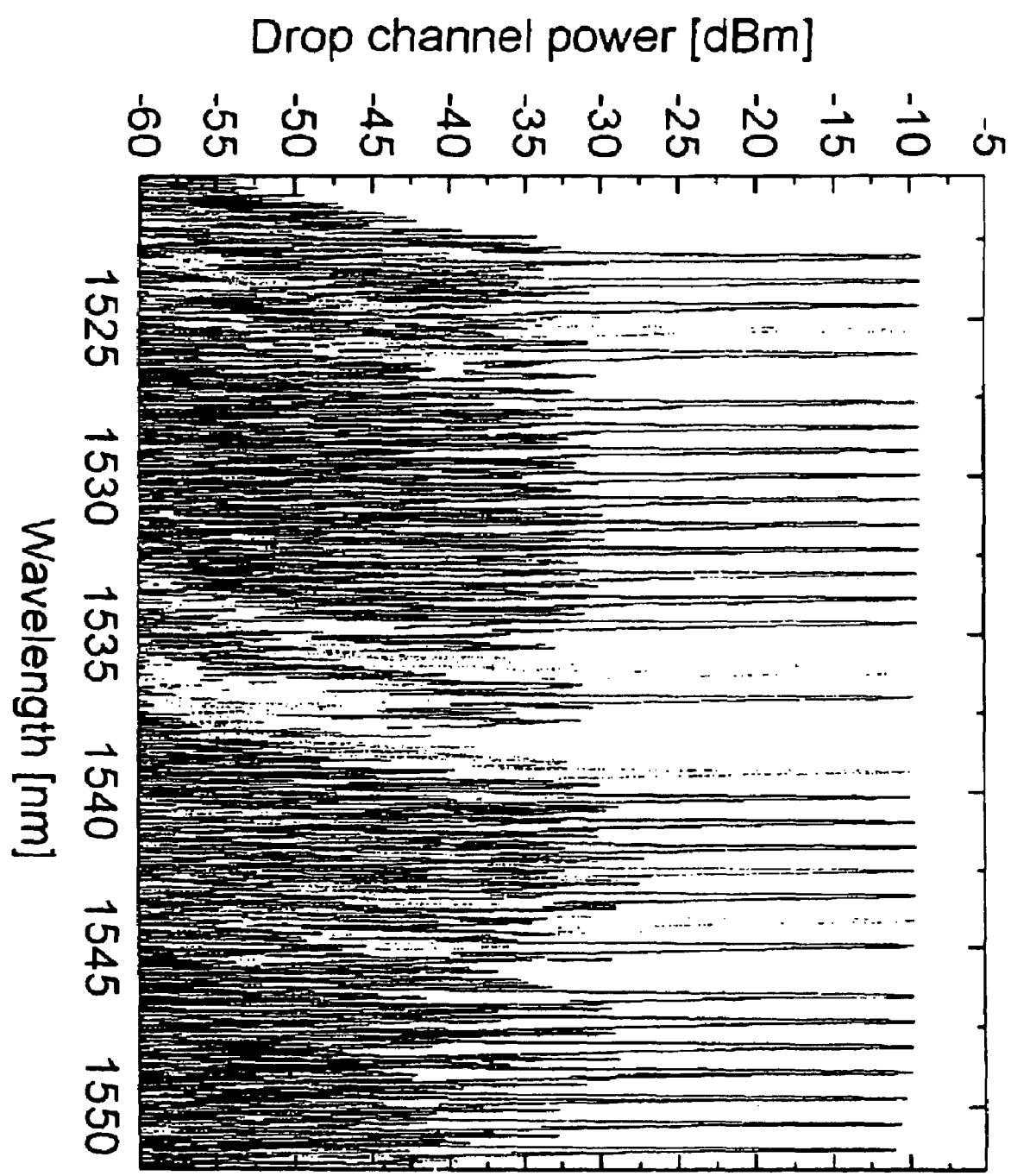
FIG. 14 illustrates experimental results of an embodiment of the invention.

This method records all of the gratings simultaneously on the substrate, which may be comprised of any suitable holographic material such as Lithium Niobate or photorefractive glass or polymer. The results shown in FIG. 13 are accomplished with gratings with a width of about 1 millimeter and a read out beam with a beam diameter of 0.5 millimeters in an iron doped Lithium niobate material. The graph results illustrate the filter shape and achieved reflected efficiency. In all wavelengths except the reflected wavelength, the transmission is at approximately 1. When the desired wavelength range is reached (in this example between 1558 and 1559 nanometers), the light transmission drops by approximately 99.7% (when a read-out beam of 0.5 millimeters is used with a grating thickness of approximately 1 millimeter). FIG. 14 illustrates drop channel power versus wavelength for a plurality of wavelengths using an embodiment of the invention.

Thus, a multi-channel tunable filter is described in conjunction with one or more specific embodiments. The invention is defined by the claims and their full scope of equivalents.

We claim:

1. A multi-channel tunable filter comprising:
   a three-dimensional filter material; and
   a continuously varying grating recorded into said three-dimensional filter material utilizing at least one continuously varying mirror stack wherein any portion of said grating is configured to reflect a given wavelength of a light wave.

2. The filter of claim 1 wherein said three-dimensional filter material is a holographic material.

3. The filter of claim 2 wherein the holographic material is Lithium Niobate.

4. The filter of claim 2 wherein the holographic material is glass.

5. The filter of claim 2 wherein the holographic material is a polymer material.

6. The filter of claim 2 wherein the holographic material is disposed to one or more lasers to stabilize the spectral emission of the one or more lasers.

7. The filter of claim 6 wherein the holographic material is disposed adjacent the emission facet of the laser.

8. The filter of claim 7 further including a collimating element disposed between the emission facet and the holographic material.

9. A method for recording a continuously varying grating comprising: reflecting a first beam off a first continuously varying mirror stack; reflecting a second beam off a continuously varying mirror stack; and producing an interference between reflection of said first beam and reflection of said second beam wherein said interference writes a continuously varying grating period in a recording material to form said grating.

10. The method of claim 9 wherein the two interfering beams are first incident onto two separate blocks of optically transparent material between which is a holographic material.

11. The method of claim 10 further wherein the holographic material is inserted with an index matching liquid that approximately matches the index of the holographic material and the blocks of optically transparent material.

12. The method of claim 11 wherein the holographic material is Lithium Niobate.

13. The method of claim 11 wherein the holographic material is glass.

14. The method of claim 11 wherein the holographic material is a polymer material.

15. The method of claim 9 wherein the first and second mirror stacks are planar mirrors.

16. The method of claim 9 wherein the first and second mirror stacks are cylindrical mirrors.

* * * * *